United States Patent
Kalika et al.

(10) Patent No.: US 12,055,289 B2
(45) Date of Patent: Aug. 6, 2024

(54) CATALYTIC HEATING SYSTEMS COMPRISING DUAL-MODE LIQUID FUEL VAPORIZERS AND METHODS OF OPERATING THEREOF

(71) Applicant: Proof Energy Inc., Fremont, CA (US)

(72) Inventors: Vlad Kalika, Ladera Ranch, CA (US); Michael Hoover, San Jose, CA (US)

(73) Assignee: Proof Energy Inc., Fremont, CA (US)

( * ) Notice: Subject to any disclaimer, the term of this patent is extended or adjusted under 35 U.S.C. 154(b) by 440 days.

(21) Appl. No.: 17/514,622

(22) Filed: Oct. 29, 2021

(65) Prior Publication Data
US 2023/0132692 A1 May 4, 2023

(51) Int. Cl.
*F23D 11/44* (2006.01)
*B01J 19/00* (2006.01)
(Continued)

(52) U.S. Cl.
CPC ........... *F23C 13/02* (2013.01); *B01J 19/0013* (2013.01); *F23D 11/38* (2013.01); *F23D 11/445* (2013.01);
(Continued)

(58) Field of Classification Search
CPC ....... F23C 13/02; B01J 19/0013; F23D 11/38; F23D 11/445; F23D 11/448; F23K 5/22
(Continued)

(56) References Cited

U.S. PATENT DOCUMENTS 4,365,952 A * 12/1982 Ohmukai ................. F23D 3/40
                                                                261/142
4,657,829 A *  4/1987 McElroy ................. B60L 58/30
                                                                429/456
(Continued)

FOREIGN PATENT DOCUMENTS

CN  212457515 U  2/2021
DE  19711681 B4  8/2006
(Continued)

OTHER PUBLICATIONS

U.S. Appl. No. 17/377,933, Non Final Office Action mailed Feb. 1, 2024, 19 pgs.
(Continued)

*Primary Examiner* — Avinash A Savani
(74) *Attorney, Agent, or Firm* — Polygon IP, LLP (57) ABSTRACT

Described herein are catalytic heating systems, comprising catalytic reactors and dual-mode fuel evaporators, and methods of operating such systems. A dual-mode fuel evaporator is thermally coupled to a catalytic reactor and comprises an electric heater used for preheating the evaporator to at least a fuel-flow threshold temperature. Upon reaching this threshold, the liquid fuel, such as ethanol or methanol, is flown into the evaporator and evaporates therein, forming vaporized fuel. The vaporized fuel is mixed with oxidant, and the mixture is flown into the catalytic reactor where the vaporized fuel undergoes catalytic exothermic oxidation. At least some heat, generated in the catalytic reactor, is transferred to the evaporator and used for the evaporation of
(Continued)

additional fuel. When the evaporator reaches or exceeds its operating threshold, the electric heater can be turned off and all heat is supplied to the evaporator from the catalytic reactor.

20 Claims, 10 Drawing Sheets (51) Int. Cl.
  *F23C 13/02* (2006.01)
  *F23D 11/38* (2006.01)
  *F23K 5/22* (2006.01)
  *H05B 1/02* (2006.01)
  *F23K 5/14* (2006.01)
  *F23L 15/04* (2006.01)

(52) U.S. Cl.
  CPC .............. *F23D 11/448* (2013.01); *F23K 5/22* (2013.01); *H05B 1/0244* (2013.01); *B01J 2219/00128* (2013.01); *B01J 2219/00132* (2013.01); *F23D 2202/00* (2013.01); *F23K 5/142* (2013.01); *F23K 2300/205* (2020.05); *F23L 15/04* (2013.01); *H05B 2203/002* (2013.01)

(58) Field of Classification Search
  USPC ........................................................... 431/6
  See application file for complete search history.

(56) References Cited

U.S. PATENT DOCUMENTS

| | | | |
|---|---|---|---|
| 5,797,737 | A | 8/1998 | Gal et al. |
| 2005/0042567 | A1 | 2/2005 | Sasaki et al. |
| 2006/0080967 | A1 | 4/2006 | Colket |
| 2006/0257707 | A1* | 11/2006 | Kaschmitter ..... H01M 8/04216 220/4.12 |
| 2007/0042301 | A1 | 2/2007 | Carroni et al. |
| 2007/0054226 | A1 | 3/2007 | Carroni et al. |
| 2007/0158451 | A1* | 7/2007 | Mao ........................ F02M 27/02 239/128 |
| 2008/0127553 | A1 | 6/2008 | Roychoudhury et al. |
| 2009/0053661 | A1 | 2/2009 | Kinnunen |
| 2009/0123885 | A1* | 5/2009 | Vestin ..................... F23C 13/02 431/258 |
| 2010/0139599 | A1 | 6/2010 | Vestin |
| 2011/0129393 | A1 | 6/2011 | Lecea et al. |
| 2012/0164547 | A1 | 6/2012 | Weingaertner et al. |
| 2018/0356092 | A1* | 12/2018 | Phillips ................ B01D 1/0017 |
| 2023/0014723 | A1 | 1/2023 | Kalika |

FOREIGN PATENT DOCUMENTS

| | | |
|---|---|---|
| GB | 2295008 B | 3/1997 |
| JP | H10103614 A | 4/1998 |
| WO | 2023077033 A1 | 5/2023 |

OTHER PUBLICATIONS

DE-19711681-A1 English translation (Year: 1997).
International Application No. PCT/US2022/073779, Search Report and Written Opinion mailed Nov. 3, 2022.

* cited by examiner

CATALYTIC HEATING SYSTEMS COMPRISING DUAL-MODE LIQUID FUEL VAPORIZERS AND METHODS OF OPERATING THEREOF

BACKGROUND

Many types of vehicles, especially medium-duty and heavy-duty vehicles, are shifting towards electrification including batteries and fuel cells. In particular, fuel cells offer high electrochemical conversion efficiency and zero emissions. Several types of fuel cells operate at high temperatures, such as molten carbonate fuel cells and solid oxide fuel cells (SOFCs). For example, the SOFC operating range can be from 600° C. to over 900° C. Heating SOFCs to their operating temperatures is typically performed with electric heaters or combustors. However, using electric heaters is expensive and inefficient. On other hand, combustors cause emissions. Catalytic heaters, described herein, provide a low emissions solution (e.g., a zero-emission solution) to heat up fuel cells up to their operating temperature. Specifically, catalytic heaters provide more control over fuel oxidation conditions. However, various operating controls in these catalytic heaters are needed to ensure efficient operations with minimal emissions.

SUMMARY

Described herein are catalytic heating systems, comprising catalytic reactors and dual-mode fuel evaporators, and methods of operating such systems. A dual-mode fuel evaporator is thermally coupled to a catalytic reactor and comprises an electric heater used for preheating the evaporator to at least a fuel-flow threshold temperature. Upon reaching this threshold, the liquid fuel, such as ethanol or methanol, is flown into the evaporator and evaporates therein, forming vaporized fuel. The vaporized fuel is mixed with oxidant, and the mixture is flown into the catalytic reactor where the vaporized fuel undergoes catalytic exothermic oxidation. At least some heat, generated in the catalytic reactor, is transferred to the evaporator and used for the evaporation of additional fuel. When the evaporator reaches or exceeds its operating threshold, the electric heater can be turned off and all heat is supplied to the evaporator from the catalytic reactor.

In some examples, a method of operating a catalytic heating system comprising a catalytic reactor and a dual-mode fuel evaporator, thermally coupled to the catalytic reactor, is provided. The method comprises heating the dual-mode fuel evaporator using an electrical heater of the dual-mode fuel evaporator until the temperature of the dual-mode fuel evaporator reaches or exceeds a fuel-flow threshold. When the temperature of the dual-mode fuel evaporator reaches or exceeds the fuel-flow threshold, the method proceeds with flowing a liquid fuel into the dual-mode fuel evaporator thereby causing the liquid fuel to evaporate and generate vaporized fuel. The method comprises mixing the vaporized fuel with oxidant thereby forming a vaporized fuel-oxidant mixture flowing the vaporized fuel-oxidant mixture into the catalytic reactor thereby causing catalytic exothermic oxidation of the vaporized fuel in the catalytic reactor and producing heat, at least partially transferred from the catalytic reactor to the dual-mode fuel evaporator.

In some examples, the method further comprises monitoring the temperature of the dual-mode fuel evaporator while the heat, produced in the catalytic reactor, at least partially transferred to the dual-mode fuel evaporator from the catalytic reactor. The method also comprises turning off the electrical heater when the temperature of the dual-mode fuel evaporator reaches or exceeds an evaporator operating threshold, higher than the fuel-flow threshold.

In some examples, turning off the electrical heater comprises gradually reducing the power output of the electrical heater as the temperature of the dual-mode fuel evaporator approaches the evaporator operating threshold.

In some examples, heating the dual-mode fuel evaporator using the electrical heater further comprises heating the catalytic reactor by heat transfer from the dual-mode fuel evaporator to the catalytic reactor. The liquid fuel is flown into the dual-mode fuel evaporator when a temperature of the catalytic reactor reaches or exceeds a fuel-receiving threshold.

In some examples, the method further comprises monitoring the temperature of the catalytic reactor while the heat, at least partially transferred to the dual-mode fuel evaporator from the catalytic reactor. The method also comprises turning off the electrical heater when the temperature of the catalytic reactor reaches or exceeds a reactor operating threshold.

In some examples, the dual-mode fuel evaporator further comprises a heater coupler, attached to and in direct contact with the catalytic reactor and comprising an evaporation surface. The dual-mode fuel evaporator comprises an evaporator chamber, extending away from the evaporation surface. The dual-mode fuel evaporator also comprises an evaporator inlet, receiving and directing the liquid fuel to the evaporation surface. In more specific examples, the electrical heater extends through the heater coupler. In the same or other examples, the electrical heater comprises multiple heating elements, evenly distributed throughout the heater coupler. The evaporator inlet can comprise a fogging nozzle.

In some examples, the catalytic reactor comprises an enclosure and a catalyst, positioned within the enclosure. The heater coupler at least partially surrounds the enclosure, positioned between the catalyst and the heater coupler. In more specific examples, the heater coupler fully surrounds the enclosure of the catalyst reactor.

In some examples, the fuel-flow threshold is at least 30° C. higher than the boiling temperature of the liquid fuel. In the same or other examples, the liquid fuel is selected from the group consisting of ethanol, methanol, and biodiesel.

In some examples, the method further comprises heating the oxidant, before mixing the vaporized fuel with the oxidant.

Also provided is a catalytic heating system comprising a catalytic reactor and a dual-mode fuel evaporator, thermally and fluidically coupled to the catalytic reactor and comprising an electric heater and a thermocouple. The catalytic heating system further comprises a liquid fuel supply, fluidically coupled to the dual-mode fuel evaporator. The catalytic heating system also comprises a system controller, communicatively coupled to the dual-mode fuel evaporator and liquid fuel supply. The system controller is configured to control the dual-mode fuel evaporator to turn on the electrical heater until the temperature of the dual-mode fuel evaporator, provided from the thermocouple, reaches or exceeds a fuel-flow threshold. The system controller is also configured to control the liquid fuel supply to flow a liquid fuel into the dual-mode fuel evaporator when the temperature of the dual-mode fuel evaporator, provided from the thermocouple, reaches or exceeds the fuel-flow threshold.

In some examples, the catalytic heating system further comprises an additional catalytic reactor, fluidically coupled to the catalytic reactor and positioned downstream relative to the catalytic reactor such that the catalytic heating system is a dual-stage catalytic heating system.

In some examples, the dual-mode fuel evaporator further comprises a heater coupler, attached to and in direct contact with the catalytic reactor and comprising an evaporation surface, wherein the electrical heater extends through the heater coupler. The dual-mode fuel evaporator also comprises an evaporator chamber, extending away from the evaporation surface, and an evaporator inlet, receiving and directing the liquid fuel to the evaporation surface. In more specific examples, the catalyst reactor comprises an enclosure and a catalyst, positioned within the enclosure. The heater coupler at least partially surrounds the enclosure, positioned between the catalyst and the heater coupler. For example, the heater coupler fully surrounds the enclosure of the catalyst reactor. In some examples, the electrical heater comprises multiple heating elements, evenly distributed throughout the heater coupler.

DETAILED DESCRIPTION

In the following description, numerous specific details are outlined to provide a thorough understanding of the presented concepts. The presented concepts may be practiced without some or all of these specific details. In other instances, well-known process operations have not been described in detail to not unnecessarily obscure the described concepts. While some concepts will be described in conjunction with the specific embodiments, it will be understood that these embodiments are not intended to be limiting.

INTRODUCTION

As noted above, vehicles use various types of heaters for interior heating, window defrosting, and even powertrain preheating (e.g., warming up battery packs). Conventional resistive heaters and fuel-fired heaters present various issues (e.g., range reduction, pollution), which makes them unsuitable for some types of vehicles (e.g., electrical vehicles and, in particular, medium and heavy-duty electrical trucks). Unlike fuel-fired heaters, catalytic heaters provide more control of the fuel oxidation conditions. For example, catalytic heaters can operate at reduced combustion temperatures, which generally correspond to less emission. However, direct fuel oxidation, especially, direct oxidation of renewable fuels (e.g., ethanol, methanol) can be challenging.

When a mixture of fuel and oxidant reaches a catalytic reactor (in a catalytic heating system), the fuel undergoes catalytic exothermic oxidation producing heat. The uniformity of the fuel-oxidant mixture entering the catalyst reactor and while contacting the catalyst in this reactor is critical for reducing emissions. It should be noted that the uniformity of this fuel-oxidant mixture is critical throughout the entire catalytic reactor. For example, a catalytic reactor can have multiple individual channels, e.g., forming a honeycomb-like structure and coated with the catalyst. The same fuel-oxidant mixture needs to enter each channel to maximize the utilization of the catalyst surface. Besides the uniformity, the fuel-oxidant mixture also needs to have the same space velocity.

Liquid fuels, such as ethanol and methanol, are inexpensive, easy to handle and store. Furthermore, liquid fuels have a high energy density. For example, the energy density of ethanol is 27 MJ/kg. All these characteristics make liquid fuels particularly attractive for catalytic heater applications. However, liquid fuels tend to generate some undesirable emissions, such as NOx, CO, PM, and HC. Atomizing liquid fuels helps to reduce these emissions, but further improvements are needed for many green-tech applications.

Figure 1:
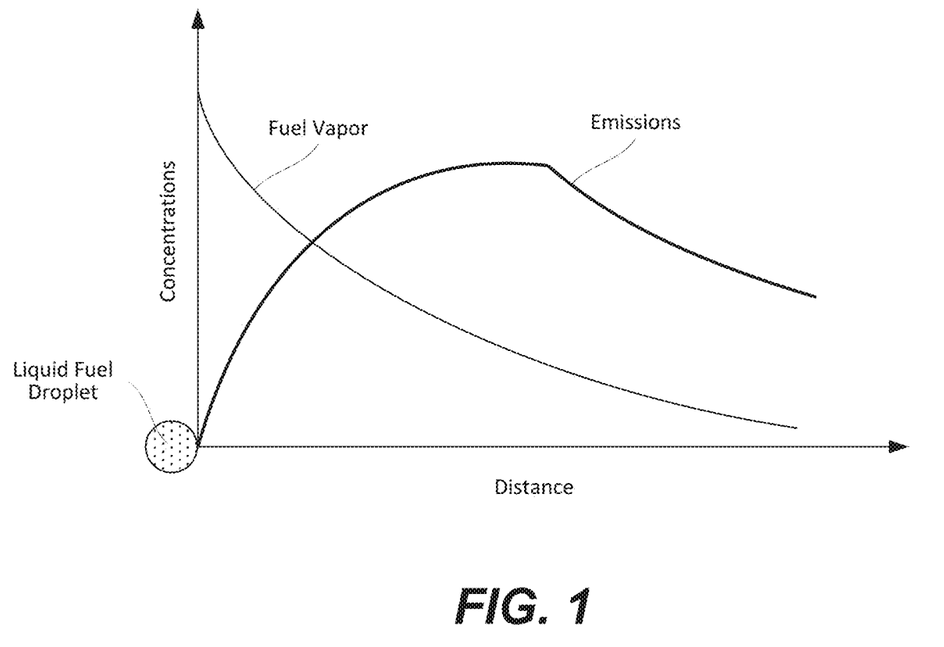
FIG. 1 is a graph illustrating a fuel-vapor concentration profile and an emissions profile for a liquid fuel model.

Specifically, atomizing the liquid fuel typically involves passing the fuel through a fogging nozzle or a fuel injector thereby reducing the droplet size. However, each small droplet needs to vaporize to react with the oxidant. FIG. 1 is a schematic illustration of a liquid fuel droplet model and corresponding vapor fuel and emission concentration profiles. The model illustrates that the liquid fuel drop forms a boundary vapor layer with varying fuel concentration, i.e., the concentration is smaller further away from the droplet due to the spatial distribution of the vapor fuel as well as fuel consumption. At the same time, ful oxidation can occur across this entire vapor layer. At some concentration ranges, oxidation can cause the undesirable formation of NOx and other emissions.

It has been found that vaporizing liquid fuels before forming fuel-oxidant mixtures and contacting the catalyst surface with these mixtures can help to avoid undesirable fuel concentrations that cause emissions. For example, switching from atomized liquid ethanol to vaporized ethanol in a catalytic heater helped to reduce carbon monoxide (CO) emission in a 2-stage catalytic heater from more than 6 g/mi to 0.05 g/mi. As a reference, the California Air Resource Board (CARB) carbon monoxide emission limit for ultra-low emission vehicles (ULEV) is 1.7 g/mi. In other words, vaporized fuels allow achieving very uniform fuel distribution in fuel-oxidant mixtures, down to molecular level. This mixture uniformity promotes the desired catalytic oxidation of the fuel and minimizes emissions.

However, the vaporization of liquid fuels requires heat. While the heat, produced by a catalytic heating system, can be used for fuel vaporization, this heat is not immediately available (e.g., when the catalytic heating system is turned on and still in the cold state). Due to the system's thermal mass, it takes some time (e.g., a few minutes) for the system to warm up and reach the level at which the heat can be supplied for fuel vaporization. At the same time, generating emissions, while the system is warming up and while the fuel is not vaporized, is not desirable.

Catalytic heating systems, described herein, comprise catalytic reactors and dual-mode fuel evaporators, thermally coupled to the catalytic reactors. A dual-mode fuel evaporator comprises an electric heater used for preheating the evaporator before the liquid fuel is supplied therein. For example, the overall system operation may start with turning on the electric heater of the dual-mode fuel evaporator before supplying any fuel. The evaporator is allowed to heat until the evaporator's temperature is at or above a fuel-flow threshold. For example, the fuel-flow threshold is higher than the fuel boiling point, e.g., at least 20° C. higher, at least 40° C. higher, at least 60° C. higher, or even at least 100° C. higher. This temperature margin (above the fuel boiling point) ensures that the vaporized fuel does not condense back to its liquid form once the fuel comes in contact with colder components of the catalytic heating system (e.g., while the system is still warming up) and also when the vaporized fuel is mixed with the oxidant, which can be supplied at a lower temperature. In some examples, the oxidant is also preheated to prevent fuel condensation. For example, another electrical heater can be positioned in an oxygen supply line. It should be noted that the fuel-flow threshold is below the coking temperature to prevent fuel decomposition.

Once the temperature of the dual-mode fuel evaporator is at or above a fuel-flow threshold, the liquid fuel is flown into the evaporator. The liquid fuel evaporates and forms vaporized fuel, which is mixed with the oxidant. The mixture is flown into the catalytic reactor where the vaporized fuel undergoes catalytic exothermic oxidation, generating heat. At least some of this generated heat is eventually transferred to the evaporator and used for the evaporation of additional fuel. It should be noted that once the heat is generated in the catalytic reactor, it may take some time for this heat transfer from the catalytic reactor to the evaporator to occur. The heat generated in the catalytic reactor initially heats various internal components of the catalytic reactor, which can have significant thermal mass. Furthermore, some heat will be carried out by exhaust (e.g., into a heat-recovery device). During this transition period, the electric heater can be used to maintain the temperature of the dual-mode fuel evaporator at or above a fuel-flow threshold. After some initial period, the catalytic reactor becomes sufficiently hot and is capable of transferring heat to the evaporator. The electric heater is turned off and further fuel vaporization utilizes the heat transferred from the catalytic reactor.

Overall, the dual-mode fuel evaporator not only vaporizes the fuel for more efficient mixing with the oxidant and catalytic reactor operation (e.g., catalyst conversion of the fuel) but also provides the seamless transition from one heating mode (using the electric heater of the evaporator) to another heating mode (using heat transferred from the catalytic reactor). In other words, the dual-mode fuel evaporator can utilize, as needed, two different heat sources: (1) its own electric heater and (2) the catalytic reactor. The first heat source (the electric heater) is independently controlled. The second heat source depends on vaporized fuel supplied to the catalytic reactor.

Examples of Catalytic Heating Systems

Figure 2A:
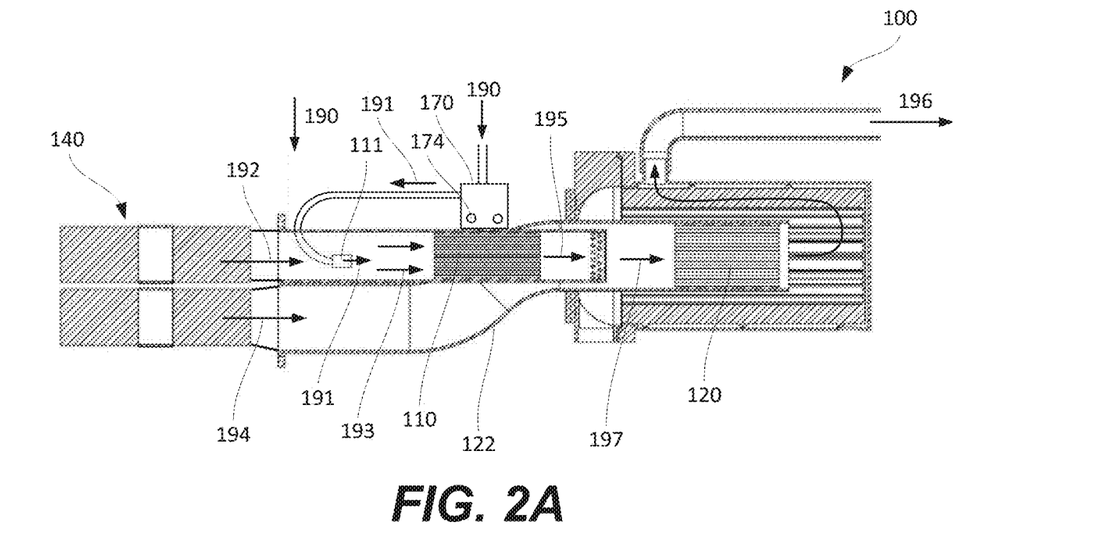
FIG. 2A is a cross-sectional view of a catalytic heating system comprising a catalytic reactor and a dual-mode fuel evaporator, in accordance with some examples.
Figure 2B:
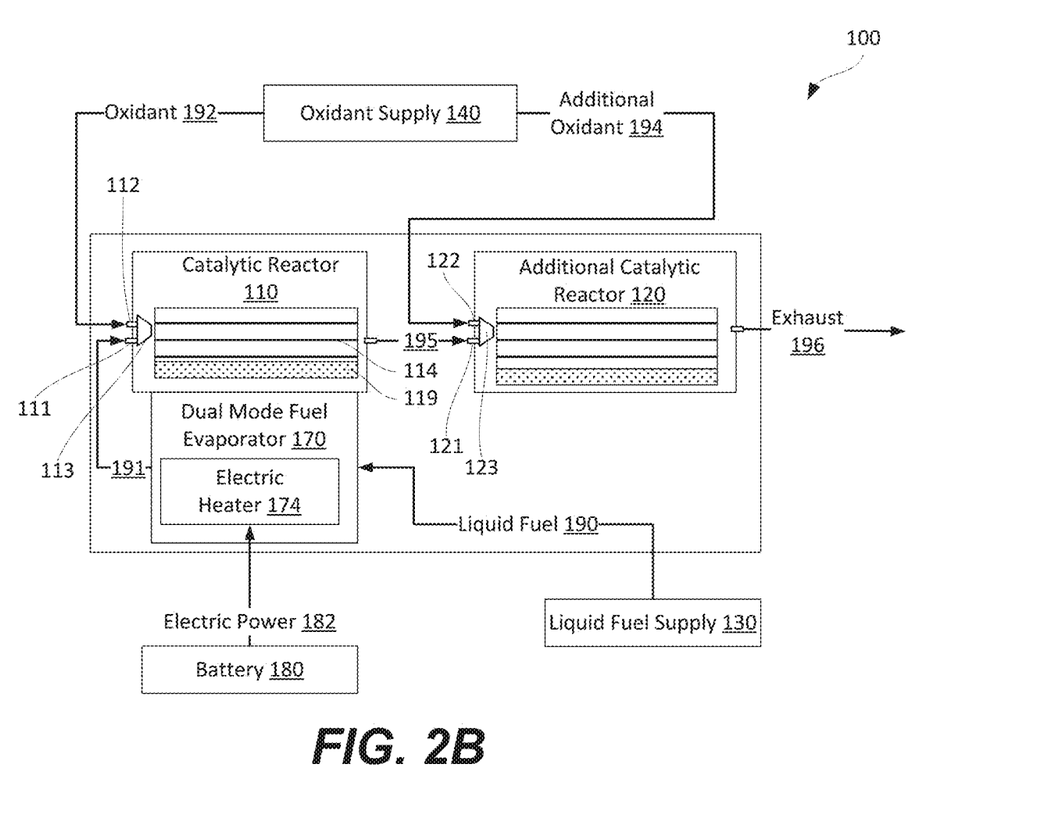
FIG. 2B is a block diagram of the catalytic heating system (as in FIG. 2A) showing additional components, in accordance with some examples.

FIG. 2A is a cross-sectional schematic view of catalytic heating system 100, in accordance with some examples. FIG. 2B is a block diagram of catalytic heating system 100 in FIG. 2A, illustrating additional components. Specifically, FIGS. 2A and 2B illustrate catalytic heating system 100 comprising dual-mode fuel evaporator 170 and two catalytic reactors, i.e., catalytic reactor 110 and additional catalytic reactor 120. This example of catalytic heating system 100 may be referred to as a two-stage catalytic heating system. Furthermore, in this example, dual-mode fuel evaporator 170 is thermally coupled to catalytic reactor 110. However, in other examples, dual-mode fuel evaporator 170 can be thermally coupled to additional catalytic reactor 120. In further examples, dual-mode fuel evaporator 170 can be coupled to both catalytic reactors. In either case, dual-mode fuel evaporator 170 is fluidically coupled catalytic reactor 110 to supply vaporized fuel 191 into catalytic reactor 110. Finally, catalytic heating system 100 with only one catalytic reactor is also within the scope.

Referring to FIGS. 2A and 2B, dual-mode fuel evaporator 170 is thermally and fluidically coupled to catalytic reactor 110. Dual-mode fuel evaporator 170 can also be fluidically coupled to liquid fuel supply 130, which stores and delivers liquid fuel 190 into dual-mode fuel evaporator 170. For example, liquid fuel supply 130 comprises fuel storage (e.g., tank), fuel filter, and/or fuel delivery device (e.g., a fuel pump, a fuel compressor). Depending on the integration of catalytic heating system 100, one or more of these components can be also parts of another system, e.g., a vehicle. For example, the fuel storage can be a vehicle fuel tank, the fuel filter can be a vehicle fuel filter, and the fuel delivery device can be a vehicle fuel pump. Some aspects of this integration are described below with reference to FIG. 3. Some examples of liquid fuel 190 include but are not limited methanol, ethanol, isopropanol, and renewable equivalents thereof (e.g., bio-methanol, bio-ethanol). In some examples, liquid fuel supply 130 comprises a replaceable cartridge. Unlike conventional fuel tanks, replaceable cartridges do not require any specific emission controls. A replaceable cartridge comprises a connecting port for connecting to the fuel line of catalytic heating system 100. For example, a replaceable cartridge can be plugged into a fuel canister shell of liquid fuel supply 130. The shell can be mounted on a vehicle and would protect the replaceable cartridge from road hazards.

Once liquid fuel 190 reaches dual-mode fuel evaporator 170, liquid fuel 190 evaporates thereby forming vaporized fuel 191. Vaporized fuel 191 is then mixed with oxidant 192, flown from oxidant supply 140. For example, catalytic reactor 110 further comprises fuel inlet 111 and oxidant inlet 112. Fuel inlet 111 is fluidically coupled to dual-mode fuel evaporator 170, while oxidant inlet 112 is fluidically coupled to oxidant supply 140. Furthermore, catalytic reactor 110 comprises fuel-oxidant mixer 113 to which fuel inlet 111 and oxidant inlet 112 are connected. Some examples of fuel-oxidant mixer 113 are injectors, jets, showerheads, nozzles (e.g., swirl nozzle), Venturi devices, and the like.

Oxidant supply 140 can be an air intake, compressor, and the like. In some examples, oxidant 192 is oxygen in the air, which is obtained from the environment. In some examples, oxidant storage is used when the ambient air is not available, e.g., mining applications, underwater applications, and the like. When catalytic heating system 100 is a two-stage system, oxidant supply 140 is configured to supply oxidant 192 into catalytic reactor 110 (to be mixed with vaporized fuel 191 and form vaporized fuel-oxidant mixture 193) and also to supply additional oxidant 194 to additional catalytic reactor 120 (to be mixed with syngas 195 produced in catalytic reactor 110 and to form syngas-oxidant mixture 197). In other words, oxidant supply 140 is a dual supply of oxidant 192 and additional oxidant 194. The flow rates of oxidant 192 and additional oxidant 194 can be independently controlled. Furthermore, in some examples, oxidant supply 140 comprises an oxidant-supply heater for heating oxidant 192, e.g., to prevent recondensation of the fuel when vaporized fuel-oxidant mixture 193 is formed. For example, oxidant 192 can be heated to a temperature above the fuel boiling temperature.

Vaporized fuel-oxidant mixture 193 is directed to catalytic reactor 110, which comprises catalyst 114. Vaporized fuel 191 (in the mixture) catalytically oxides upon contacting catalyst 114 and forms exhaust 196 (in a single-stage catalytic system) or syngas 195 (in a two-stage catalytic system). This catalytic oxidation is an exothermic reaction, producing heat that heats catalytic reactor 110 and is partially removed by exhaust 196 or syngas 195.

In a two-stage catalytic system, catalytic reactor 110 can be operated at a lower temperature than additional catalytic reactor 120. For example, catalytic reactor 110 can be maintained from 500° C. to 700° C., while additional catalytic reactor 120 can be maintained from 600° C. and 800° C. One having ordinary skill in the art would understand that these operating target temperatures depend on the fuel type, oxidant type, fuel-oxidant ratios, catalysts, and other like conditions. The temperature is controlled by controlling the fuel flow rate and the oxidant flow rates. It should be noted that these flow rates also control the fuel-rich and fuel-lean conditions in catalytic reactor 110 and additional catalytic reactor 120, respectively.

Catalyst 114 is specifically selected to achieve catalytic exothermic oxidation of vaporized fuel 191. Some examples of materials suitable for catalyst 114 include, but are not limited to rhodium, ceria, platinum, and palladium. For example, when catalytic heating system 100 comprises two catalytic reactors, catalyst 114 of catalytic reactor 110 can comprise rhodium and ceria, while catalyst of additional catalytic reactor 120 can comprise platinum and palladium.

In some examples, catalyst 114 is arranged as a layer (e.g., formed in part by catalyst particles) on a support structure (e.g., such as metallic support). Lower operating temperatures of these reactors allow using metallic support, rather than ceramic support that is common in a conventional catalytic converter. In comparison to ceramic supports, metallic supports are more robust to vibration and temperature fluctuations. Furthermore, metallic supports have better thermal conductivity, which is important for catalyst preheating and maintaining uniform temperature throughout the entire catalyst. The metallic supports may be specifically configured to balance the flow rate through the reactor and the operating surface area.

Before vaporized fuel-oxidant mixture 193 is introduced into catalytic reactor 110, the temperature of catalyst 114 needs to be brought to an operating range. For example, catalytic reactor 110 can be equipped with reactor preheater 119. In some examples, dual-mode fuel evaporator 170 can be used for preheating catalyst 114, in addition to or instead of reactor When catalytic reactor 110 produces syngas 195, syngas 195 is then combined with additional oxidant 194 and directed to additional catalytic reactor 120, which forms exhaust 196. Similar to catalytic reactor 110, additional catalytic reactor 120 comprises additional fuel inlet 121 (which may be also referred to as a syngas inlet) and additional oxidant inlet 122. Additional fuel inlet 121 is fluidically coupled to an outlet of catalytic reactor 110, while additional oxidant inlet 122 is fluidically coupled to oxidant supply 140. Furthermore, additional catalytic reactor 120 comprises additional fuel-oxidant mixer 123 to which additional fuel inlet 121 and additional oxidant inlet 122 are connected.

Referring to FIGS. 2A-2F, dual-mode fuel evaporator 170 comprises electric heater 174 such as an automotive glow plug, a hot plate, a heat tape, or a heater cartridge. Electric heater 174 can receive electric power 182 from battery 180 or some other source (e.g., an electric generator). The power supply to electric heater 174 is controlled by system controller 150, various aspects of which are described below with reference to FIG. 2G. In some examples, electric heater 174 comprises multiple elements spread apart within dual-mode fuel evaporator 170 to provide uniform heating. For example, an electric glow plug having a power of 50 W-200 W can be used as electric heater 174. Multiple electric glow plugs and/or a higher power heaters can be used to expedite the initial heating process.

Figure 2C:
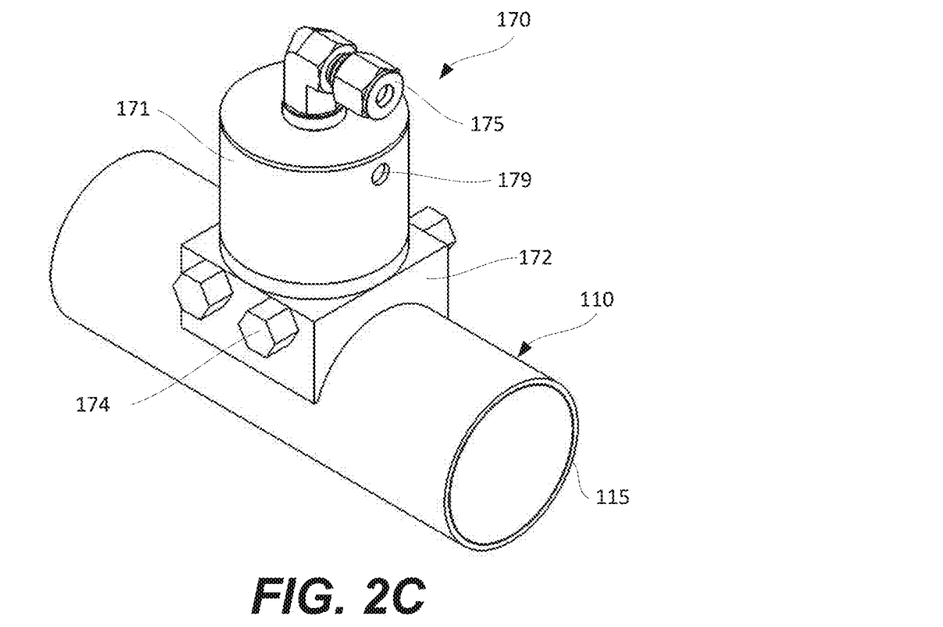
FIG. 2C is a perspective view of a dual-mode fuel evaporator, attached and thermally coupled to a catalytic reactor, in accordance with some examples.
Figure 2D:
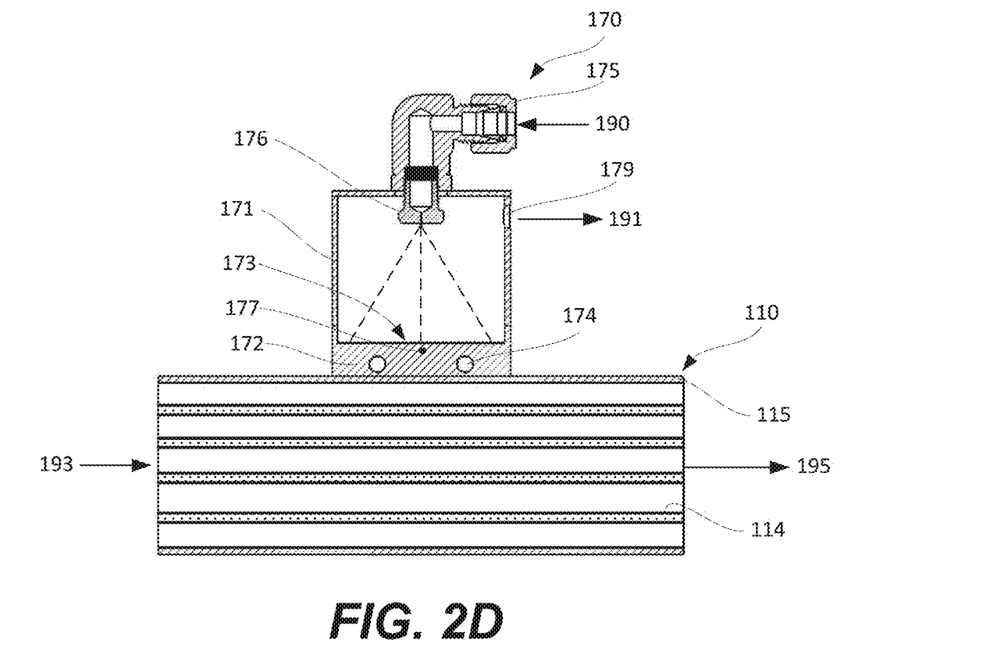
FIG. 2D is a cross-sectional view of the dual-mode fuel evaporator and the catalytic reactor in FIG. 2C, in accordance with some examples.

Referring to FIG. 2D, in some examples, dual-mode fuel evaporator 170 comprises thermocouple 177 for measuring the temperature of dual-mode fuel evaporator 170. The temperature input is provided to system controller 150. This evaporator temperature is used to determine when liquid fuel 190 can be flown into dual-mode fuel evaporator 170, e.g., when the temperature of dual-mode fuel evaporator 170 reaches or exceeds a fuel-flow threshold.

Furthermore, this temperature is used to determine when electric heater 174 of dual-mode fuel evaporator 170 can be turned off, e.g., when the temperature of dual-mode fuel evaporator 170 reaches or exceeds an evaporator operating thresholds. Various examples of these thresholds are described below with reference to FIGS. 4 and 5A.

Figure 2E:
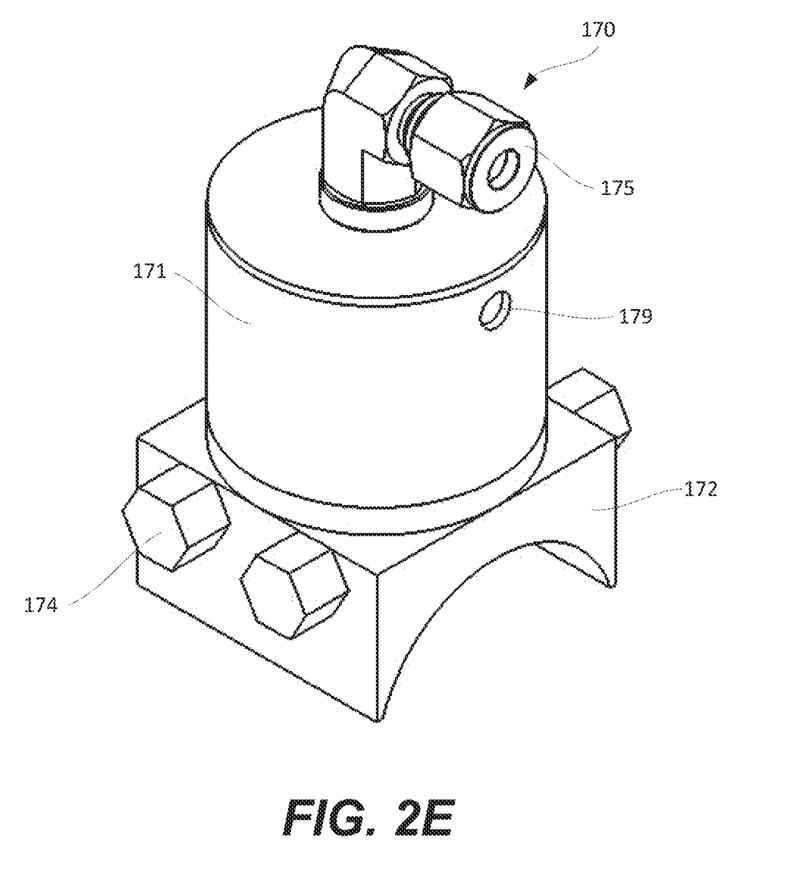
FIG. 2E is a perspective view of a dual-mode fuel evaporator as a standalone component, in accordance with some examples.
Figure 2F:
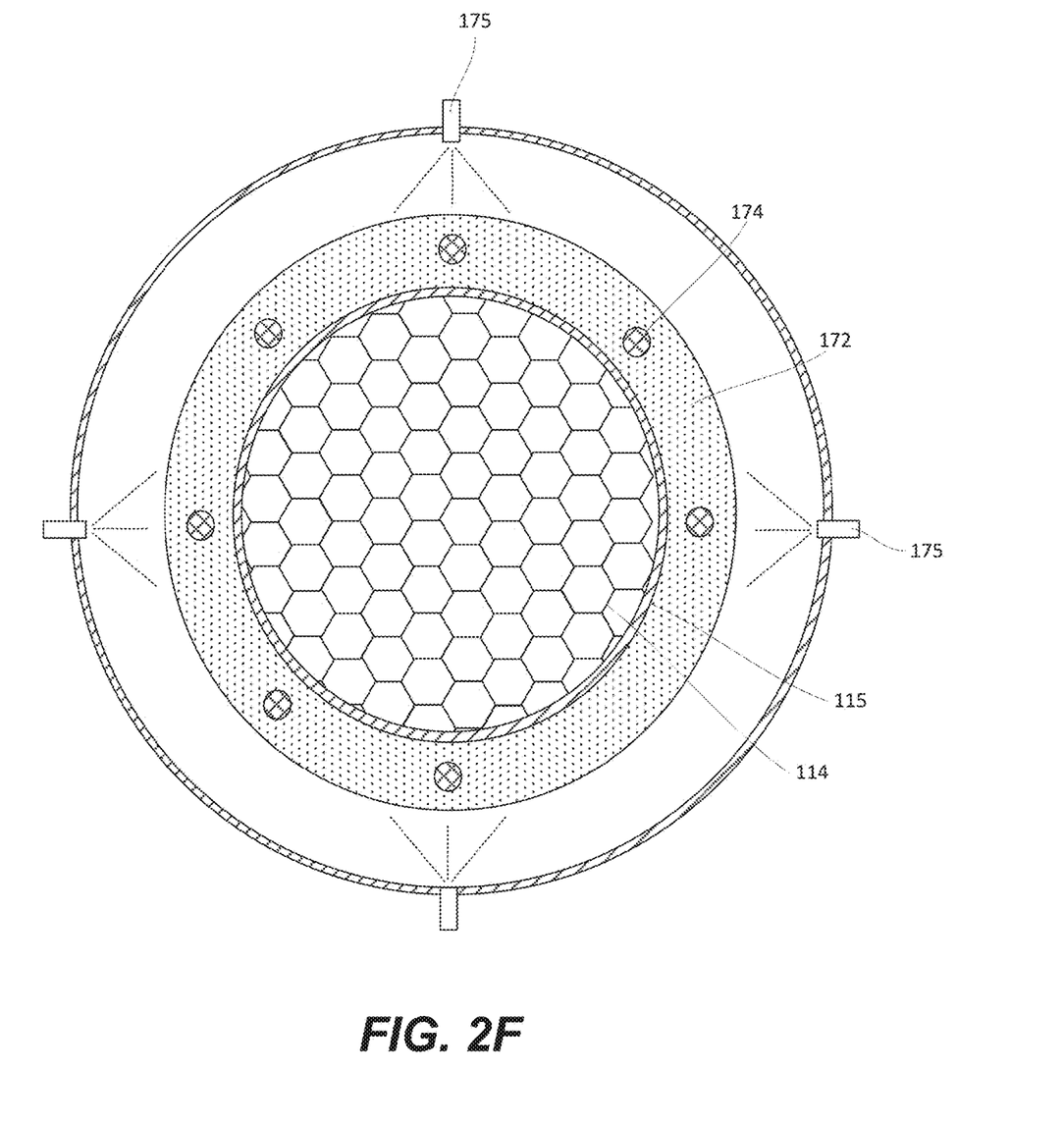
FIG. 2F is a cross-sectional view of a dual-mode fuel evaporator fully enclosing a catalytic reactor, in accordance with some examples.

Referring to FIGS. 2C-2E, in some examples, dual-mode fuel evaporator 170 further comprises heater coupler 172. Heater coupler 172 can be shaped like a saddle and used for positioning and thermally coupling to catalytic reactor 110. For example, FIG. 2C illustrates catalytic reactor 110 comprising cylindrical enclosure 115 with catalyst 114, positioned within enclosure 115. Heater coupler 172 conforms to at least a portion of this enclosure 115 thereby ensuring the thermal coupling. Specifically, heater coupler 172 at least partially surrounds enclosure 115, positioned between catalyst 114 and heater coupler 172. In some examples, heater coupler 172 fully surrounds enclosure 115 of catalyst heater 110 as, e.g., is shown in FIG. 2F.

Heater coupler 172 comprises evaporation surface 173. During the operation of dual-mode fuel evaporator 170, liquid fuel 190 is directed at evaporation surface 173 where liquid fuel 190 is vaporized. In some examples, thermocouple 177 is configured to measure the temperature of evaporation surface 173, e.g., to ensure that this temperature reaches or exceeds the fuel-flow threshold.

Dual-mode fuel evaporator 170 further comprises evaporator chamber 171, extending away from evaporation surface 173. Evaporator chamber 171 captures any vaporized fuel 191 and directs vaporized fuel 191 to evaporator outlet 179, which is fluidically coupled with catalytic reactor 110 or, more specifically, to fuel inlet 111 of catalytic reactor 110. In some examples, evaporator chamber 171 and heater coupler 172 are formed from stainless steel. In some examples, evaporator chamber 171 is insulated to prevent heat losses to the environment and reduce the overall heating requirements.

Dual-mode fuel evaporator 170 also comprises evaporator inlet 175, receiving and directing liquid fuel 190 to evaporation surface 173. For example, evaporator inlet 175 can comprise fogging nozzle 176. Other types of inlets are also within the scope.

Catalytic heating system 100 generates heat due to the exothermic oxidation of the fuel and provides for one or more ways to recover this heat (e.g., for various needs in a vehicle). For example, catalytic heating system 100 comprises a heat exchanger for receiving exhaust 196 and recovering heat from exhaust 196 (e.g., to transfer the heat to thermal fluid supplied to other systems).

System Controller Examples

Figure 2G:
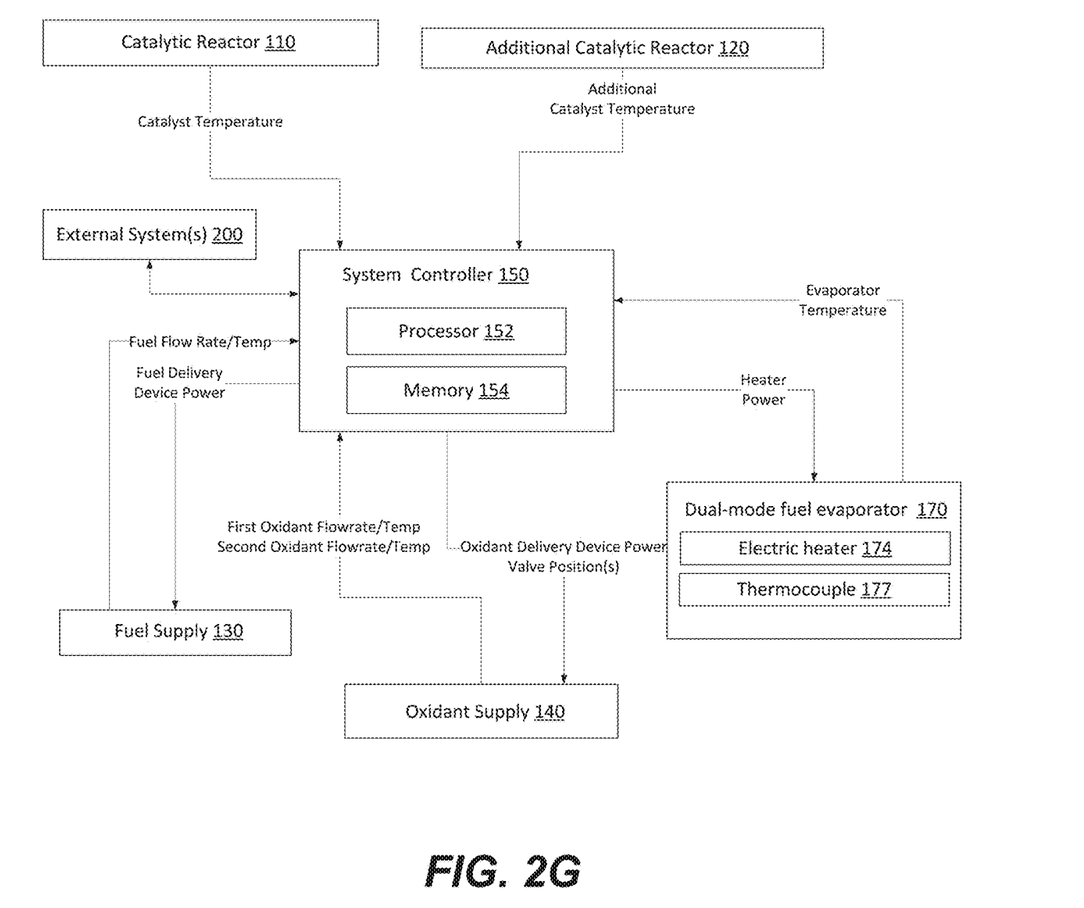
FIG. 2G is a block diagram illustrating a system controller interacting with various other components of the catalytic heating system, in accordance with some examples.

In some examples, catalytic heating system 100 comprises system controller 150, communicatively coupled to at least dual-mode fuel evaporator 170 and liquid fuel supply 130 as, e.g., is schematically shown in FIG. 2G. In more specific examples, system controller 150 is communicatively coupled to catalytic reactor 110, additional catalytic reactor 120, oxidant supply 140, and/or external systems 200 (e.g., vehicle's electronic control unit (ECU) and the like).

System controller 150 is configured to control various operations of dual-mode fuel evaporator 170. Specifically, system controller 150 is configured to turn on electrical heater 174 until the temperature of dual-mode fuel evaporator 170 reaches or exceeds the fuel-flow threshold. The fuel-flow threshold is determined by the type of liquid fuel 190 used for powering catalytic heating system 100. Furthermore, system controller 150 is configured to turn off electrical heater 174, e.g., when the temperature of dual-mode fuel evaporator 170 reaches or exceeds the evaporator operating threshold. This turning off function may be binary or gradual. For example, system controller 150 can gradually reduce the power supplied electrical heater 174 as the temperature of dual-mode fuel evaporator 170 approaches the evaporator operating threshold.

System controller 150 is also configured to control various operations of liquid fuel supply 130. Specifically, system controller 150 is configured to flow liquid fuel 190 into dual-mode fuel evaporator 170 when the temperature of dual-mode fuel evaporator 170 reaches or exceeds the fuel-flow threshold.

System controller 150 comprises processor 152 and memory 154, storing various operating parameters of catalytic heating system 100. Some examples of these parameters are the fuel-flow temperature threshold for dual-mode fuel evaporator 170, the operating temperature threshold for dual-mode fuel evaporator 170, and the like. Various other controlled operating parameters are also within the scope, such as flow rates of various components at various stages, temperatures of various components at various stages, and the like. Processor 152 uses various inputs to system controller 150 as well as the operating parameters in memory 154 to determine operating instructions for various components of catalytic heating system 100, such as power settings for catalyst heaters and delivery devices and/or valve positions.

System Integration Examples

Figure 3:
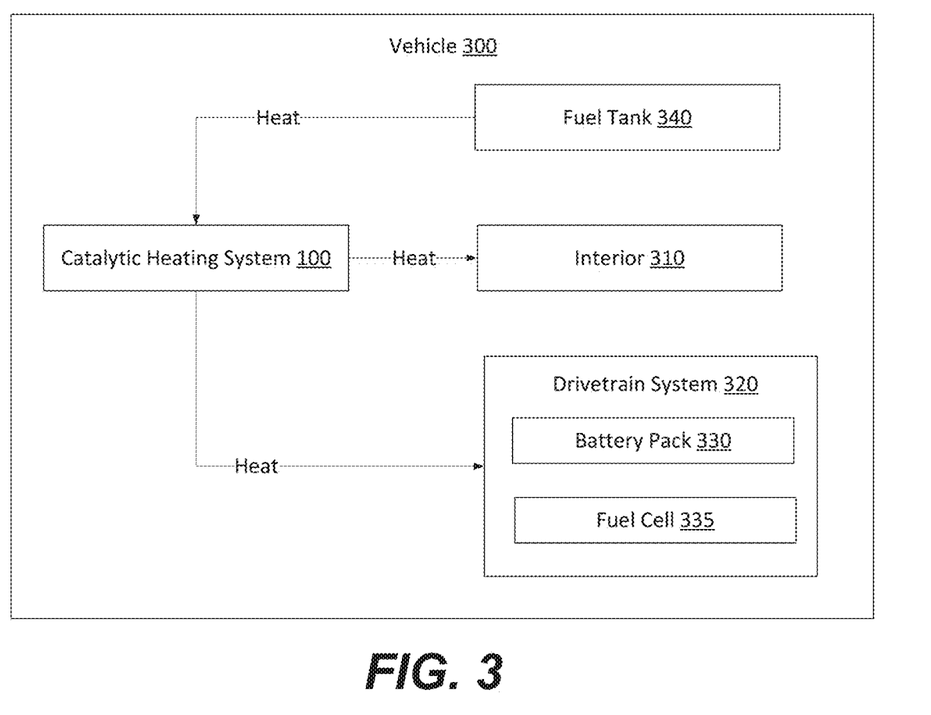
FIG. 3 is a block diagram of a vehicle comprising a catalytic heating system, in accordance with some examples.

FIG. 3 is a block diagram illustrating various examples of integrating catalytic heating system 100 into vehicle 300. While this integration is shown in the context of vehicle, one having ordinary skill in the art would understand that integrating catalytic heating system 100 can be similarly integrated into other systems, requiring heat, such as power plants (e.g., utilizing fuel cells), residential and commercial heating-ventilation-air conditioning (HVAC) systems) and the like. Unlike conventional heaters, catalytic heating system 100 produces heat in a cost-efficient, energy-efficient, and low-emission manner.

For example, catalytic heating system 100 can be used to supply heat to interior 310 of vehicle 300 (e.g., to maintain the interior temperature at the desired level, to defrost windows, and the like). Specifically, the thermal fluid is pumped between catalytic heating system 100 (wherein the thermal fluid is heated) and a radiator (wherein the thermal fluid is cooled to heat air). The radiator may be coupled to an air blower, which directs the heated air from the radiator into the vehicle cabin. In the same or other examples, catalytic heating system 100 can be used to supply heat to powertrain system 320 or, more specifically, to battery pack 330. One having ordinary skill in the art would appreciate that the operating temperature of battery pack 330 can deviate from the environmental temperature (e.g., vehicle 300 is parked outside during a winter night). To achieve the efficient operation of battery pack 330, thermal fluid can be pumped between catalytic heating system 100 and battery pack 330 to bring battery pack 330 to the operating temperature.

In some examples, catalytic heating system 100 is used for preheating fuel cell 335, which can be a part vehicle's drivetrain system 320, integrated into other systems or applications, or be a standalone component. As noted above, several types of fuel cells operate at high temperatures, such as molten carbonate fuel cells and solid oxide fuel cells (SOFCs), e.g., from 600° C. to over 900° C. for SOFCs. Catalytic heating system 100 can be used for preheating fuel cell 335 to its operating temperature.

In some examples, vehicle 300 is equipped with fuel tank 340, e.g., an internal combustion vehicle, a plug-in hybrid vehicle. Fuel tank 340 can be used to supply the fuel to catalytic heating system 100, effectively eliminating the need for a separate fuel supply at the heating system level. A similar integration can be used on the oxidant supply side.

Examples of Operating Catalytic Heating Systems

Figure 4:
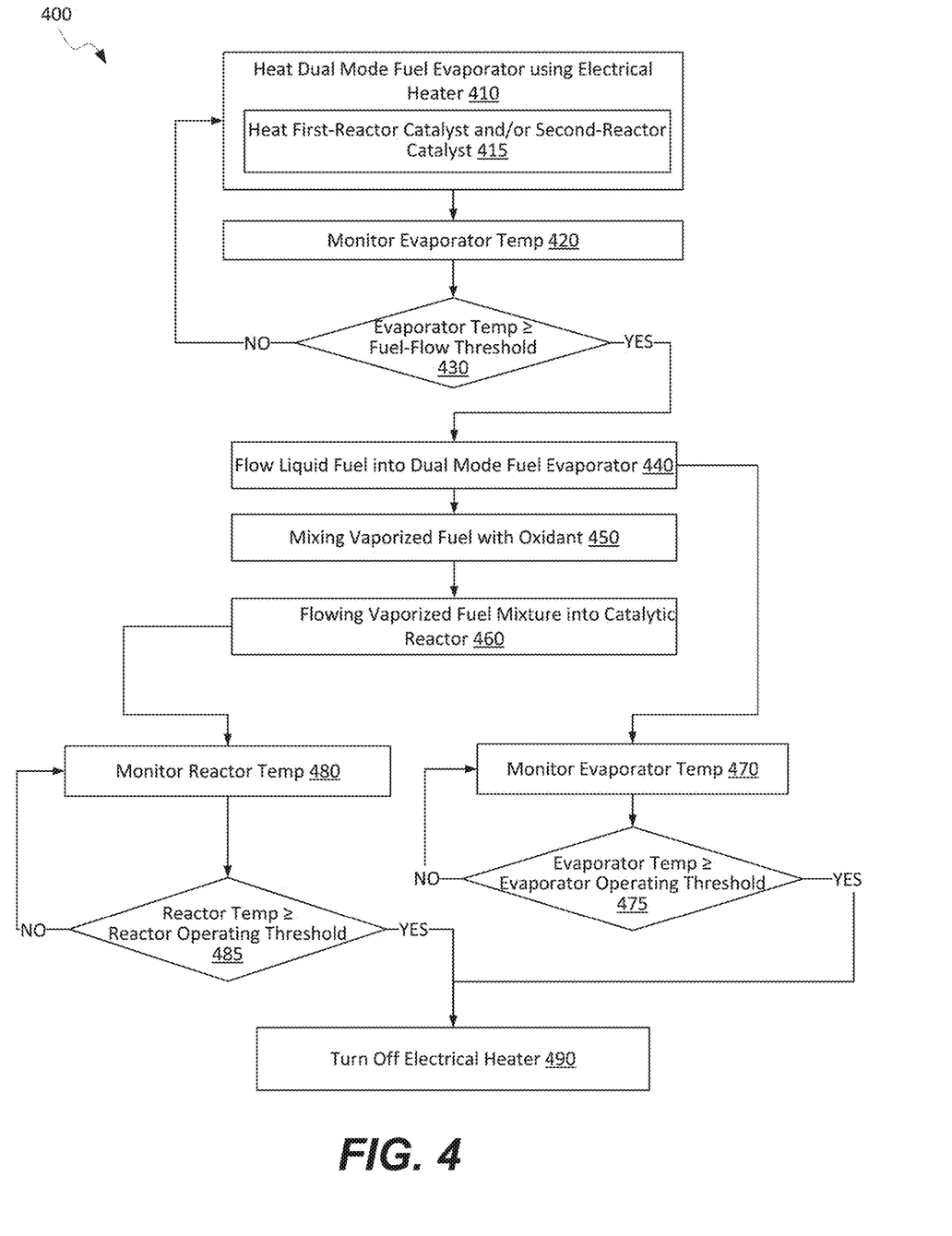
FIG. 4 is a process flowchart corresponding to a method of operating a catalytic heating system comprising a catalytic reactor and a dual-mode fuel evaporator, in accordance with some examples.

FIG. 4 is a process flowchart corresponding to method 400 of operating catalytic heating system 100, in accordance with some examples. Various aspects of catalytic heating system 100 are described above with reference to FIGS. 2A-2G. Specifically, catalytic heating system 100 comprises dual-mode fuel evaporator 170 equipped with electrical heater 174.

Method 400 comprises (block 410) heating dual-mode fuel evaporator 170 using electrical heater 174 of dual-mode fuel evaporator 170. This heating operation continues until the temperature of dual-mode fuel evaporator 170 reaches or exceeds the fuel-flow threshold as shown by decision block 430. In some examples, electrical heater 174 is kelp on until the temperature of dual-mode fuel evaporator 170 reaches or exceeds the evaporator operating threshold as shown by decision block 475.

Figure 5A:
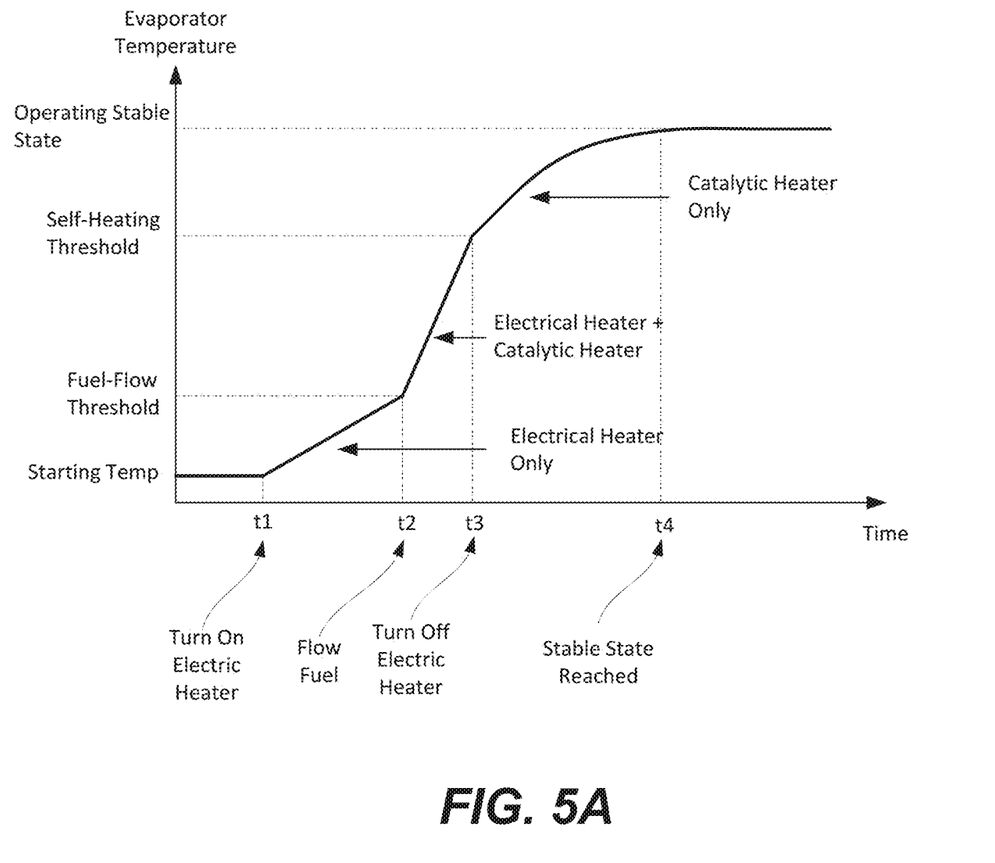
FIG. 5A is a temperature profile of the dual-mode fuel evaporator during the operation of the catalytic heating system, in accordance with some examples.
Figure 5B:
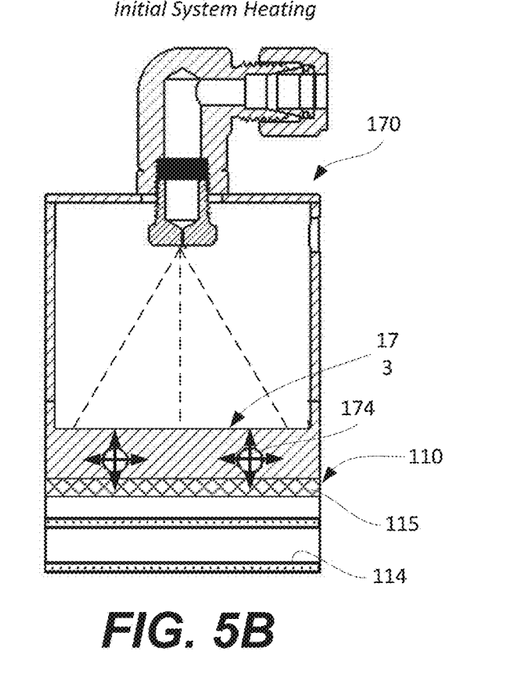
FIG. 5B is a cross-sectional view of the dual-mode fuel evaporator showing the heat supplied solely by the evaporator's electrical heater during the initial preheating stage, in accordance with some examples.

The temperature profile of dual-mode fuel evaporator 170 is shown in FIG. 5A. The heating of dual-mode fuel evaporator 170 is initiated at t1. At this point, the starting temperature of dual-mode fuel evaporator 170 can be at an ambient level. At this point, the heating is performed using only electrical heater 174. This heating continues until t2, at which point the temperature of dual-mode fuel evaporator 170 reaches the fuel-flow threshold. FIG. 56 is a schematic cross-sectional illustration of dual-mode fuel evaporator 170 showing heat generated by two elements of electrical heater 174 and flowing to evaporation surface 173. It should be noted that some heat, produced by electrical heater 174, also flows to catalytic reactor 110 or, more specifically, to enclosure 115 of catalytic reactor 110.

Returning to FIG. 4, in some examples, (block 410) heating dual-mode fuel evaporator 170 using electrical heater 174 further comprises (block 415) heating catalytic reactor 110. As noted above with reference to FIG. 5B, at least some heat generated by electrical heater 174 of dual-mode fuel evaporator 170 can be transferred to catalytic reactor 110, which is thermally coupled to dual-mode fuel evaporator 170. This heat transfer (from dual-mode fuel evaporator 170 to catalytic reactor 110) should be distinguished from the heat transfer to dual-mode fuel evaporator 170 (from catalytic reactor 110) during the stable-state operation of catalytic heating system 100. It should be noted that liquid fuel 190 is flown into dual-mode fuel evaporator 170 when the temperature of catalytic reactor 110 reaches or exceeds the fuel-receiving threshold. The heating of catalytic reactor 110 can be performed solely by electrical heater 174 of dual-mode fuel evaporator 170. Alternatively, the heating of catalytic reactor 110 can be performed by electrical heater 174 of dual-mode fuel evaporator 170 as well as a dedicated heater of catalytic reactor 110. In some examples, heating of catalytic reactor 110 using electrical heater 174 of dual-mode fuel evaporator 170 is negligible or not performed and most or all heating is performed by the dedicated heater of catalytic reactor 110. In further examples, dual-mode fuel evaporator 170 can be at least partially heated using the dedicated heater of catalytic reactor 110.

When the temperature of dual-mode fuel evaporator 170 reaches or exceeds the fuel-flow threshold, method 400 proceeds with (block 440) flowing liquid fuel 190 into dual-mode fuel evaporator 170 thereby causing liquid fuel 190 to evaporate and generate vaporized fuel 191. It should be noted that the fuel-flow threshold is above the evaporation temperature of liquid fuel 190. The fuel-flow threshold depends on the type of liquid fuel 190 as well as other factors, e.g., the thermal mass of other components of catalytic heating system 100, the current temperature of the other components, various characteristics of oxidant 192 (e.g., temperature, flow rate, specific heat). The fuel-flow threshold is selected to ensure that vaporized fuel 191 does not recondense after vaporized fuel 191 leaves dual-mode fuel evaporator 170. In some examples, the fuel-flow threshold is dynamically controlled based on various conditions and parameters listed above. In some examples, the fuel-flow threshold is higher than the fuel boiling point, e.g., at least 20° C. higher, at least 40° C. higher, at least 60° C. higher, or even at least 100° C. higher. In more specific examples, methanol's boiling point is about 65° C. The fuel-flow threshold can be at least 100° C., at least 125° C., or at least 150° C. when methanol is used as fuel. Ethanol's boiling point is about 78° C. n this example, the fuel-flow threshold can be at least 110° C., at least 135° C., or at least 150° C.

Method 400 proceeds with (block 450) mixing vaporized fuel 191 with oxidant 192 thereby forming vaporized fuel mixture 193. For example, vaporized fuel 191 and oxidant 192 can be supplied to fuel-oxidant mixer 113 of catalytic reactor 110 as described above.

Method 400 proceeds with (block 460) flowing vaporized fuel-oxidant mixture 193 into catalytic reactor 110 thereby causing catalytic exothermic oxidation of vaporized fuel 191 and producing heat. This heat is at least partially transferred to dual-mode fuel evaporator 170. It should be noted that when vaporized fuel-oxidant mixture 193 is initially flown into catalytic reactor 110, electrical heater 174 of dual-mode fuel evaporator 170 can continue to operate. In other words, dual-mode fuel evaporator 170 can be heated from two sources during this period: (1) electrical heater 174 and (2) catalytic reactor 110.

Figure 5C:
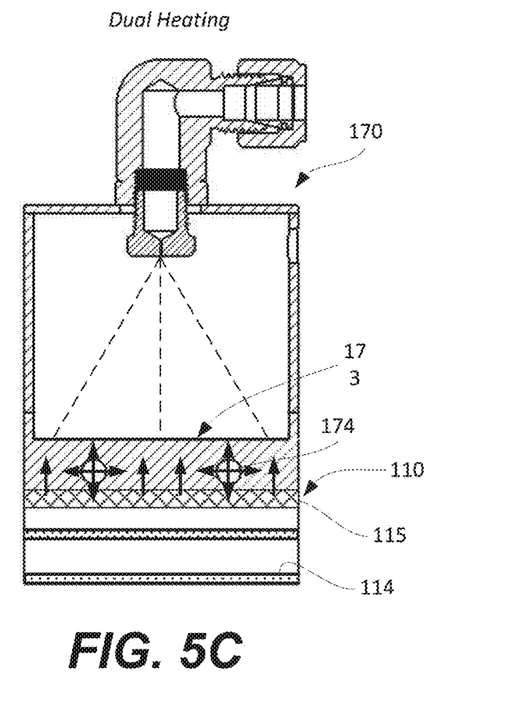
FIG. 5C is a cross-sectional view of the dual-mode fuel evaporator showing the heat supplied by the evaporator's electrical heater and by the catalytic reactor, in accordance with some examples.

Referring to FIG. 5A, vaporized fuel-oxidant mixture 193 is flown into catalytic reactor 110 at t2. The temperature of dual-mode fuel evaporator 170 at this point is at the fuel-flow threshold and is not sufficient for electrical heater 174 to be turned off. Due to the two heat sources working simultaneously, the heating rate of dual-mode fuel evaporator 170 between t2 and t3 is faster than between t1 and t2, at least in this example. This combination heating continues until t3, at which point dual-mode fuel evaporator 170 reaches the evaporator operating threshold, and electrical heater 174 can be turned off. FIG. 5C is a schematic cross-sectional view of dual-mode fuel evaporator 170 with electrical heater 174 still no and while the heat is also being transferred from catalytic reactor 110.

Returning to FIG. 4, in some examples, method 400 comprises (block 470) monitoring the temperature of dual-mode fuel evaporator 170 while the heat, produced by catalytic reactor 110, at least partially transferred to dual-mode fuel evaporator 170 from catalytic reactor 110. This temperature monitoring operation is similar to the one described above with reference to block 420. In fact, the evaporator temperature monitoring can be one continuous operation. The evaporator temperature is supplied to system controller 150, which determines at which point the fule can be flown into dual-mode fuel evaporator 170 and, at which point, electrical heater 174 can be turned off.

Method 400 also comprises (block 490) turning off electrical heater 174 when (decision block 475) the temperature of dual-mode fuel evaporator 170 reaches or exceeds an evaporator operating threshold. The evaporator operating threshold is higher than the fuel-flow threshold, e.g., 30° C. higher, 50° C. higher, or even 100° C. higher. The evaporator operating threshold can be also referred to as an evaporator self-heating threshold. This threshold is sufficiently high that the heat from electrical heater 174 is no longer needed. In some examples, the power output of electrical heater 174 can be gradually reduced as the temperature of dual-mode fuel evaporator 170 approaches the evaporator operating threshold.

Figure 5D:
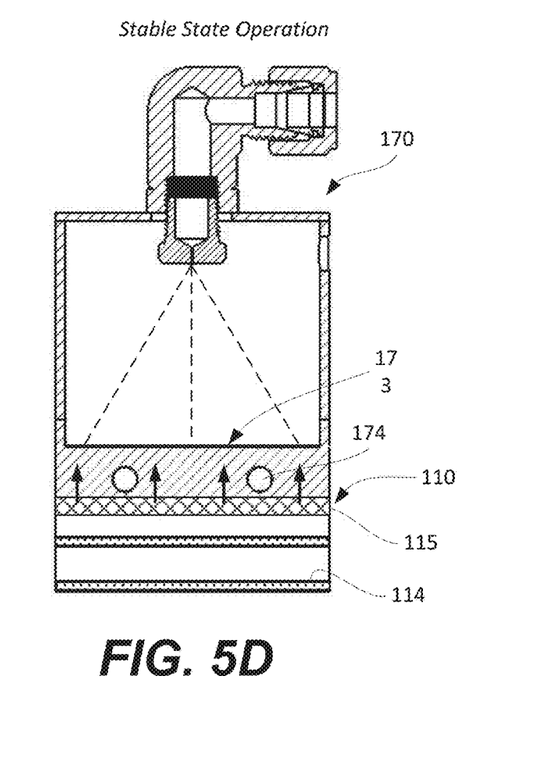
FIG. 5D is a cross-sectional view of the dual-mode fuel evaporator showing the heat supplied solely by the catalytic reactor during the post-preheating operation, in accordance with some examples.

Referring to FIG. 5A, electrical heater 174 is turned off at t3. Further heating of dual-mode fuel evaporator 170 is performed by catalytic reactor 110. At some point, schematically shown as t4, the temperature of dual-mode fuel evaporator 170 can reach a steady state, e.g., all heat received from catalytic reactor 110 is either consumed for fuel vaporization or lost to the environment. FIG. 5D is a schematic cross-sectional view of dual-mode fuel evaporator 170 with electrical heater 174 turned off and heat is being transferred from catalytic reactor 110.

Returning to FIG. 4, in some examples, the temperature of catalytic reactor 110 can be used as feedback for controlling the operation of dual-mode fuel evaporator 170. In these examples, method 400 may comprise (block 480) monitoring the temperature of catalytic reactor 110 while the heat, generated by catalytic reactor 110, at least partially transferred to dual-mode fuel evaporator 170 from catalytic reactor 110. Method 400 then proceeds with (block 490) turning off electrical heater 174 (decision block 485) when the temperature of catalytic reactor 110 reaches or exceeds a reactor operating threshold.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered illustrative and not restrictive.

What is claimed is:

1. A method of operating a catalytic heating system comprising a catalytic reactor and a dual-mode fuel evaporator, thermally coupled to the catalytic reactor, the method comprising:
   heating the dual-mode fuel evaporator using an electrical heater of the dual-mode fuel evaporator until temperature of the dual-mode fuel evaporator reaches or exceeds a fuel-flow threshold;
   when the temperature of the dual-mode fuel evaporator reaches or exceeds the fuel-flow threshold, flowing a liquid fuel into the dual-mode fuel evaporator thereby causing the liquid fuel to evaporate and generate vaporized fuel;
   mixing the vaporized fuel with oxidant thereby forming a vaporized fuel-oxidant mixture;
   flowing the vaporized fuel-oxidant mixture into the catalytic reactor thereby causing catalytic exothermic oxidation of the vaporized fuel in the catalytic reactor and producing heat, at least partially transferred from the catalytic reactor to the dual-mode fuel evaporator;
   monitoring the temperature of the dual-mode fuel evaporator while the heat, produced in the catalytic reactor, at least partially transferred to the dual-mode fuel evaporator from the catalytic reactor; and
   turning off the electrical heater when the temperature of the dual-mode fuel evaporator reaches or exceeds an evaporator operating threshold, higher than the fuel-flow threshold.

2. The method of claim 1, wherein turning off the electrical heater comprises gradually reducing power output of the electrical heater as the temperature of the dual-mode fuel evaporator approaches the evaporator operating threshold.

3. The method of claim 1, wherein:
   heating the dual-mode fuel evaporator using the electrical heater further comprising heating the catalytic reactor by heat transfer from the dual-mode fuel evaporator to the catalytic reactor, and
   the liquid fuel is flown into the dual-mode fuel evaporator when temperature of the catalytic reactor reaches or exceeds a fuel-receiving threshold.

4. A method of operating a catalytic heating system comprising a catalytic reactor and a dual-mode fuel evaporator, thermally coupled to the catalytic reactor, the method comprising:
   heating the dual-mode fuel evaporator using an electrical heater of the dual-mode fuel evaporator until temperature of the dual-mode fuel evaporator reaches or exceeds a fuel-flow threshold;
   when the temperature of the dual-mode fuel evaporator reaches or exceeds the fuel-flow threshold, flowing a liquid fuel into the dual-mode fuel evaporator thereby causing the liquid fuel to evaporate and generate vaporized fuel;
   mixing the vaporized fuel with oxidant thereby forming a vaporized fuel-oxidant mixture;
   flowing the vaporized fuel-oxidant mixture into the catalytic reactor thereby causing catalytic exothermic oxidation of the vaporized fuel in the catalytic reactor and producing heat, at least partially transferred from the catalytic reactor to the dual-mode fuel evaporator;
   monitoring a temperature of the catalytic reactor while the heat, at least partially transferred to the dual-mode fuel evaporator from the catalytic reactor; and
   turning off the electrical heater when the temperature of the catalytic reactor reaches or exceeds a reactor operating threshold.

5. The method of claim 1, wherein the dual-mode fuel evaporator further comprises:
   a heater coupler, attached to and in direct contact with the catalytic reactor and comprising an evaporation surface;
   an evaporator chamber, extending away from the evaporation surface; and
   an evaporator inlet, receiving and directing the liquid fuel to the evaporation surface.

6. The method of claim 5, wherein the electrical heater extends through the heater coupler.

7. The method of claim 6, wherein the electrical heater comprises multiple heating elements, evenly distributed throughout the heater coupler.

8. The method of claim 5, wherein:
   the catalytic reactor comprises an enclosure and a catalyst, positioned within the enclosure, and
   the heater coupler at least partially surrounds the enclosure, positioned between the catalyst and the heater coupler.

9. The method of claim 8, wherein the heater coupler fully surrounds the enclosure of the catalytic reactor.

10. The method of claim 5, wherein the evaporator inlet comprises a fogging nozzle.

11. A method of operating a catalytic heating system comprising a catalytic reactor and a dual-mode fuel evaporator, thermally coupled to the catalytic reactor, the method comprising:
    heating the dual-mode fuel evaporator using an electrical heater of the dual-mode fuel evaporator until temperature of the dual-mode fuel evaporator reaches or exceeds a fuel-flow threshold;
    when the temperature of the dual-mode fuel evaporator reaches or exceeds the fuel-flow threshold, flowing a liquid fuel into the dual-mode fuel evaporator thereby causing the liquid fuel to evaporate and generate vaporized fuel;

mixing the vaporized fuel with oxidant thereby forming a vaporized fuel-oxidant mixture; and flowing the vaporized fuel-oxidant mixture into the catalytic reactor thereby causing catalytic exothermic oxidation of the vaporized fuel in the catalytic reactor and producing heat, at least partially transferred from the catalytic reactor to the dual-mode fuel evaporator, wherein the fuel-flow threshold is at least 30° C. higher than boiling temperature of the liquid fuel.

12. The method of claim 1, wherein the liquid fuel is selected from the group consisting of ethanol, methanol, and biodiesel.

13. The method of claim 1, wherein further comprising heating the oxidant, before mixing the vaporized fuel with the oxidant.

14. A dual-stage catalytic heating system comprising:
a catalytic reactor;
an additional catalytic reactor, fluidically coupled to the catalytic reactor and positioned downstream relative to the catalytic reactor;
a dual-mode fuel evaporator, thermally and fluidically coupled to the catalytic reactor and comprising an electric heater and a thermocouple;
a liquid fuel supply, fluidically coupled to the dual-mode fuel evaporator; and
a system controller, communicatively coupled to the dual-mode fuel evaporator and liquid fuel supply and configured to:
control the dual-mode fuel evaporator to turn on the electrical heater until temperature of the dual-mode fuel evaporator, provided from the thermocouple, reaches or exceeds a fuel-flow threshold, and
control the liquid fuel supply to flow a liquid fuel into the dual-mode fuel evaporator when the temperature of the dual-mode fuel evaporator, provided from the thermocouple, reaches or exceeds the fuel-flow threshold.

15. A catalytic heating system comprising:
a catalytic reactor;
a dual-mode fuel evaporator, thermally and fluidically coupled to the catalytic reactor and comprising:
an electric heater,
a thermocouple,
a heater coupler, attached to and in direct contact with the catalytic reactor and comprising an evaporation surface, wherein the electrical heater extends through the heater coupler,
an evaporator chamber, extending away from the evaporation surface, and
an evaporator inlet, receiving and directing liquid fuel to the evaporation surface;
a liquid fuel supply, fluidically coupled to the dual-mode fuel evaporator; and
a system controller, communicatively coupled to the dual-mode fuel evaporator and liquid fuel supply and configured to:
control the dual-mode fuel evaporator to turn on the electrical heater until temperature of the dual-mode fuel evaporator, provided from the thermocouple, reaches or exceeds a fuel-flow threshold, and
control the liquid fuel supply to flow a liquid fuel into the dual-mode fuel evaporator when the temperature of the dual-mode fuel evaporator, provided from the thermocouple, reaches or exceeds the fuel-flow threshold.

16. The catalytic heating system of claim 15, wherein the catalytic reactor comprises an enclosure and a catalyst, positioned within the enclosure, and
the heater coupler at least partially surrounds the enclosure, positioned between the catalyst and the heater coupler.

17. The catalytic heating system of claim 16, wherein the heater coupler fully surrounds the enclosure of the catalytic reactor.

18. The catalytic heating system of claim 15, wherein the electrical heater comprises multiple heating elements, evenly distributed throughout the heater coupler.

19. The dual-stage catalytic heating system of claim 14, wherein:
the dual-mode fuel evaporator further comprises a heater coupler, attached to and in direct contact with the catalytic reactor and comprising an evaporation surface, and
the electrical heater comprises multiple heating elements, evenly distributed throughout the heater coupler.

20. The method of claim 1, wherein:
the dual-mode fuel evaporator further comprises a heater coupler, attached to and in direct contact with the catalytic reactor and comprising an evaporation surface, and
the electrical heater comprises multiple heating elements, evenly distributed throughout the heater coupler.

* * * * *